V. H. TRIGG.
LOAD LIFTING DEVICE.
APPLICATION FILED APR. 3, 1916.
1,210,235.  Patented Dec. 26, 1916.
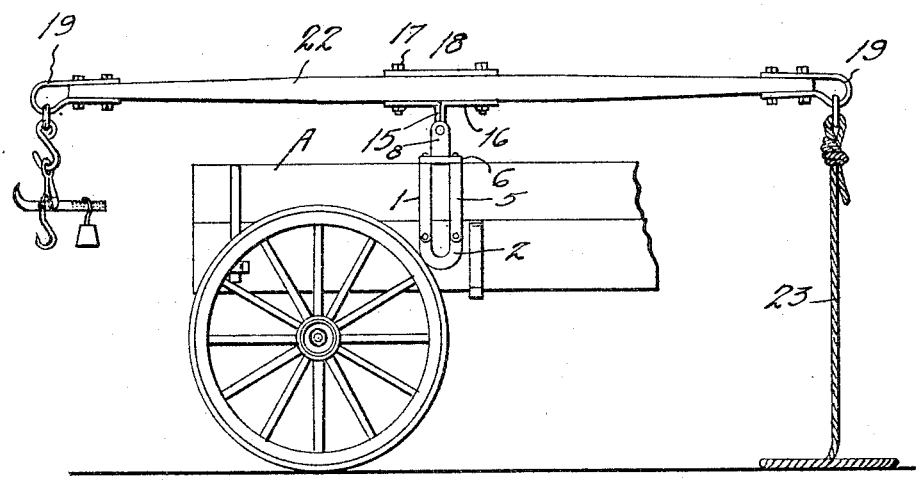
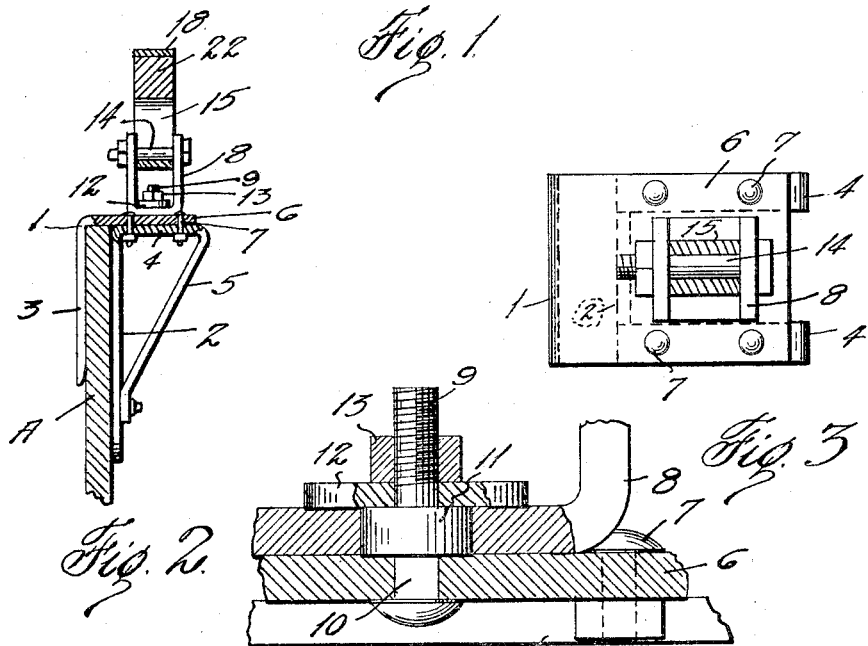
INVENTOR
V. H TRIGG.
BY
ATTORNEY

UNITED STATES PATENT OFFICE.

VAN H. TRIGG, OF MILFORD, TEXAS.

LOAD-LIFTING DEVICE.

1,210,235.   Specification of Letters Patent.   Patented Dec. 26, 1916.

Application filed April 3, 1916. Serial No. 88,714.

*To all whom it may concern:*

Be it known that I, VAN H. TRIGG, citizen of the United States, residing at Milford, in the county of Ellis and State of Texas, have invented certain new and useful Improvements in Load-Lifting Devices, of which the following is a specification.

This invention pertains to new and useful improvements in load lifting devices.

In the carrying out of the invention a lifting lever is fulcrumed on a member of particular construction arranged to embrace the side of a wagon or similar body; said lever having eyes at its ends, one for the attachment of a load engaging device in which a scale may be included and the other having connection with a fall rope by which the lever may be manipulated and the load raised or lowered. It is proposed to construct the fulcrum member or clamp with a rigid jaw formed to straddle the upper edge of the side of a wagon body and also providing a lateral support or table on which a yoke is swiveled, and to hinge in the upper end of the yoke a shank to the upper end of which a lever is fastened; whereby said lever may be swung both horizontally and vertically and is universally mounted.

Other objects will be apparent from a perusal of the following specification and the invention will be more fully understood by reference to the accompanying drawings, wherein:

Figure 1 is a side elevation of a portion of a wagon showing the device mounted thereon, Fig. 2 is a detail of the device partially in transverse section, Fig. 3 is a plan view of the clamp and yoke, a portion of the shank appearing in section, and Fig. 4 is a sectional detail.

In the drawings the numeral 1 designates a metal clamp which is formed of two parts, 2 and 3 respectively. The part 2 is made of a strip of metal bent into a U-shape with its upper portions 4 directed laterally and bent downwardly to form braces 5 which have their lower ends fastened to the part 2 adjacent its lower end. The part 3 is in the form of a plate bent at right angles to form a table 6 which is fastened on the portions 4 by means of bolts 7. The table 6 is sufficiently long to space the depending leg of the part 3 from the U-shaped portion of the part 2 and provide a jaw shaped to grasp the side of a wagon body A as shown. On the clamp is mounted a yoke 8 which is rotatable on the table 6. As shown in detail in Fig. 4 a swivel bolt 9 is passed up through the table and held against rotation therein by a squared portion 10. A collar 11 is fixed on the bolt and is inserted in the base of the yoke which rotates therearound, said yoke being held on the collar by an overlapping washer 12 larger in diameter than the collar. A nut 13 threaded on the bolt 9 holds the washer in place.

A pintle 14 is fastened transversely of the upper end of the yoke and has hinged thereon the lower end of a shank 15. The shank is opposite laterally directed portions 16 at its upper end and is of sufficient height to support a lever 22 at the proper elevation, said lever being supported on the portion 16 and fastened thereto by bolts 17 also passing through a cap plate 18 on the upper side of the lever. The lever is mounted on the shank intermediate its ends and may be swung in a vertical arc on the pintle or rotated by the swivel connection of the yoke. Eyes 19 are fastened on each end of the lever and in one of these a hook 20 is mounted, while a rope 23 depends from the other. The clamp is positioned on the wagon body near one end as shown and when it is desired to load a bale of cotton into the body A and at the same time weigh it a cotton scale 21 may be attached to the hook and the lever tilted so that the scale may be attached to the bale. By pulling on the rope the lever will be swung and the bale elevated, when the weight can be ascertained and the bale then swung into the wagon. Bags of cotton may be weighed and loaded in the same way and other objects can be loaded and unloaded with this device. One man can operate the lever and can easily remove the device from the wagon body and carry it if necessary from place to place. The clamp readily slips over the side of a wagon body or bin and with the aid of the rope sufficient leverage is had to lift any reasonable weight. The construction of the clamp, yoke and swivel is simple and yet highly important to the successful operation of the device.

What I claim, is:

In a load lifting device; the combination of a two part clamp comprising a substantially triangular member bent to form lateral supports on which the other member bent at right angles is secured, said members having their depending portions spaced apart to form a jaw; a swivel member mounted on the angular member of the clamp; and a load lifting device mounted on the swivel member.

In testimony whereof I affix my signature.

VAN H. TRIGG.